US006994628B2

(12) United States Patent  (10) Patent No.: US 6,994,628 B2
Boyd  (45) Date of Patent: Feb. 7, 2006

(54) LOCKING SWIVEL APPARATUS WITH REPLACEABLE INTERNAL GEAR MEMBERS

(75) Inventor: Anthony Ray Boyd, Loreauville, LA (US)

(73) Assignee: Boyd's Bit Service, Inc., Lake Charles, LA (US)

( * ) Notice: Subject to any disclaimer, the term of this patent is extended or adjusted under 35 U.S.C. 154(b) by 75 days.

(21) Appl. No.: 10/352,845

(22) Filed: Jan. 28, 2003

(65) Prior Publication Data

US 2004/0144567 A1  Jul. 29, 2004

(51) Int. Cl.
E21B 19/00 (2006.01)
(52) U.S. Cl. ........................................ 464/163; 175/321
(58) Field of Classification Search ................ 175/321; 166/242.7; 464/163
See application file for complete search history.

(56) References Cited

U.S. PATENT DOCUMENTS

| 1,723,934 | A |  | 8/1929 | Heggem |
|---|---|---|---|---|
| 2,016,042 | A |  | 10/1935 | Lewis |
| 2,100,418 | A |  | 11/1937 | Welikanov |
| 3,762,725 | A |  | 10/1973 | Taylor |
| 3,948,588 | A |  | 4/1976 | Curington et al. |
| 4,051,456 | A |  | 9/1977 | Heilhecker et al. |
| 4,062,551 | A |  | 12/1977 | Base |
| 4,064,953 | A |  | 12/1977 | Collins |
| 4,074,775 | A |  | 2/1978 | Lee |
| 4,106,575 | A |  | 8/1978 | Bunnelle |
| 4,200,297 | A |  | 4/1980 | Tricon |
| 4,226,447 | A |  | 10/1980 | Brown |
| 4,256,179 | A |  | 3/1981 | Shillander |
| 4,333,530 | A |  | 6/1982 | Armstrong |
| 4,388,969 | A |  | 6/1983 | Marshall et al. |
| 4,399,877 | A |  | 8/1983 | Jackson et al. |
| 4,401,170 | A |  | 8/1983 | Cherrington |
| 4,449,596 | A |  | 5/1984 | Boyadjieff |
| 4,470,469 | A |  | 9/1984 | Coakley et al. |
| 4,506,729 | A |  | 3/1985 | Davis, Jr. et al. |
| 4,524,834 | A |  | 6/1985 | Barron et al. |
| 4,572,305 | A |  | 2/1986 | Swietlik |
| 4,575,359 | A |  | 3/1986 | Bermingham |
| 4,613,002 | A |  | 9/1986 | Pittman et al. |
| 4,619,326 | A |  | 10/1986 | Van Mierlo |
| 4,681,162 | A |  | 7/1987 | Boyd |
| 4,813,493 | A |  | 3/1989 | Shaw et al. |
| 4,821,814 | A |  | 4/1989 | Willis et al. |
| 4,862,976 | A | * | 9/1989 | Meek ......................... 175/296 |
| RE33,150 | E |  | 1/1990 | Boyd |

(Continued)

FOREIGN PATENT DOCUMENTS

GB    2266324 A    10/1993

(Continued)

OTHER PUBLICATIONS

Bowen Power Swivels, date unknown, source unknown.

(Continued)

*Primary Examiner*—John R. Cottingham

(57) ABSTRACT

A locking swivel apparatus is provided. The locking swivel includes an upper body portion having a counter bore about a cylindrical axis and a mandrel receivable in the counter bore. The apparatus further includes a locking arrangement, including at least one replaceable gear member, disposed to engage with the upper body portion and the mandrel. The locking arrangement is further disposed to selectively couple and decouple the upper body portion and the mandrel, such selective coupling and decoupling disposed to correspondingly constrain and allow relative rotation of the upper body portion and the mandrel about the cylindrical axis. Embodiments of the locking swivel include two replaceable gears disposed to selectively engage and disengage one another.

51 Claims, 8 Drawing Sheets

U.S. PATENT DOCUMENTS

| | | |
|---|---|---|
| 4,984,641 A | 1/1991 | Pryor |
| 5,086,844 A | 2/1992 | Mims et al. |
| 5,117,927 A | 6/1992 | Askew |
| 5,168,943 A | 12/1992 | Falgout, Sr. |
| 5,224,898 A * | 7/1993 | Johnson et al. ............... 464/20 |
| 5,284,210 A | 2/1994 | Helms et al. |
| 5,314,032 A | 5/1994 | Pringle et al. |
| 5,351,767 A | 10/1994 | Stogner et al. |
| 5,368,111 A | 11/1994 | Benoit et al. |
| 5,373,906 A | 12/1994 | Braddick |
| 5,396,952 A | 3/1995 | Stogner |
| 5,495,901 A | 3/1996 | Livingstone et al. |
| 5,664,627 A | 9/1997 | Boyd |
| 5,735,351 A | 4/1998 | Helms |
| 5,738,178 A | 4/1998 | Williams et al. |
| 5,996,712 A | 12/1999 | Boyd |
| 6,244,345 B1 | 6/2001 | Helms |
| 6,269,879 B1 | 8/2001 | Boyd |
| 6,378,630 B1 | 4/2002 | Ritorto et al. |

FOREIGN PATENT DOCUMENTS

| | | |
|---|---|---|
| GB | 2268560 A | 1/1994 |
| GB | 2307495 A | 5/1997 |
| GB | 2338013 A | 12/1999 |
| GB | 2341653 A | 3/2000 |
| GB | 2358421 A | 7/2001 |
| WO | WO-9310326 | 5/1993 |
| WO | WO-9315303 | 8/1993 |
| WO | WO-9719248 | 5/1997 |
| WO | WO-9829637 | 7/1998 |
| WO | WO-9909290 | 2/1999 |

OTHER PUBLICATIONS

"Boyd's Mechanical Locking Swivel" brochure, Boyd's Rental Tools.

Boyd's Bit Service, Inc., d/b/a Boyd's Rental Tools, advertising material prepared for Baker/Atlas Canada, Jul. 1999.

Boyd's Bit Service, Inc., d/b/a Boyd's Rental Tools general purpose advertising material, Jul. 1999.

Boyd's Bit Service, Inc., d/b/a Boyd's Rental Tools general purpose advertising material (details), Jul. 1999.

* cited by examiner

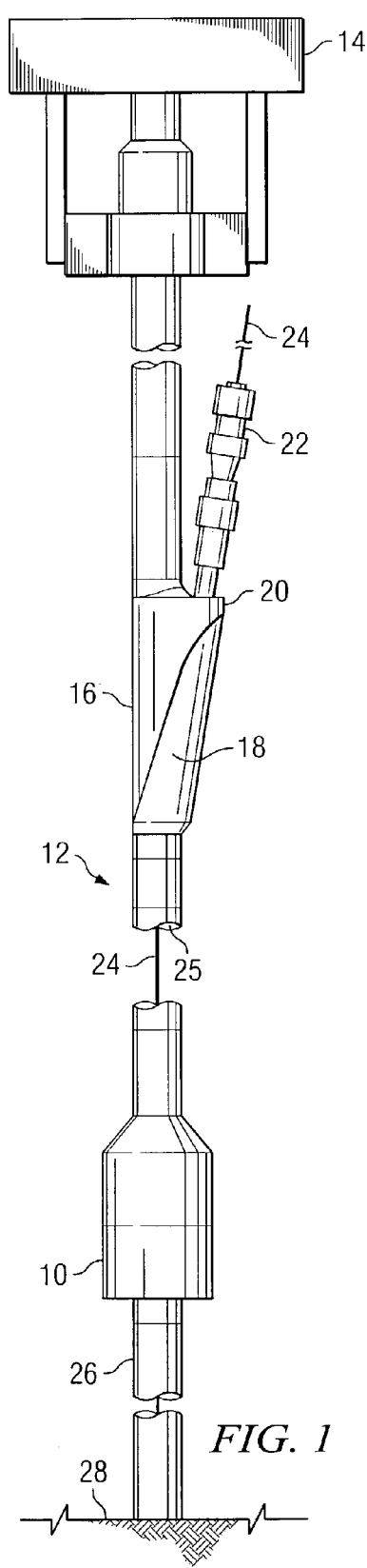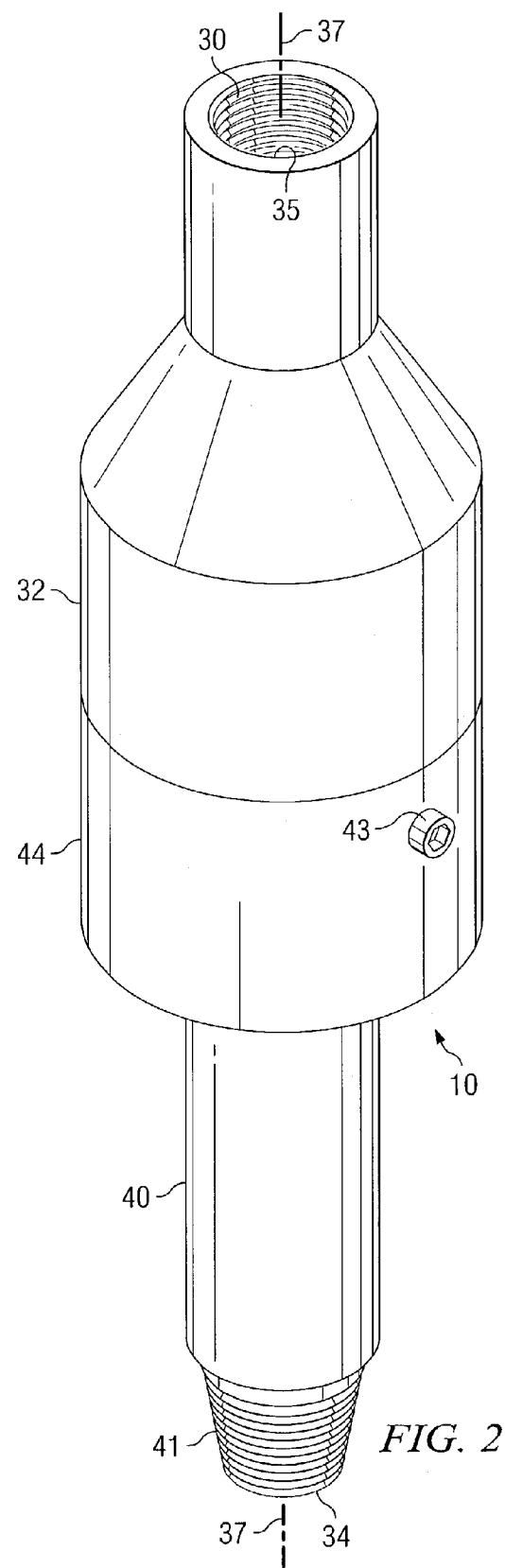
FIG. 1
FIG. 2

US 6,994,628 B2

LOCKING SWIVEL APPARATUS WITH REPLACEABLE INTERNAL GEAR MEMBERS

TECHNICAL FIELD OF THE INVENTION

The present invention relates generally to the drilling of oil and gas wells, and more specifically, to a locking swivel that includes replaceable locking gears and/or a supplemental locking mechanism.

BACKGROUND OF THE INVENTION

Locking swivel devices are well known in the mechanical arts and are used in a wide variety of applications, such as medical device, sporting good, motor vehicle, and drilling applications. For example, during well drilling operations, a conventional locking swivel apparatus may be coupled to a drill string at the surface of the well (e.g., above the rotary table) with a portion of the drill string extending from the locking swivel downhole into the well bore. Locking the swivel couples the portion of the drill string disposed below the swivel to that disposed above (e.g., a side entry wire apparatus and/or an upper drive assembly), constraining them to rotate together about a longitudinal (usually cylindrical) axis. Unlocking the swivel allows the portion of the drill string disposed below the swivel to rotate about the longitudinal axis with respect to the portion disposed above the swivel.

U.S. Pat. No. 5,996,712 to Boyd discloses a Mechanical Locking Swivel Apparatus including an upper body portion having a counter bore for receiving the upper end of a mandrel, the mandrel being able to move within the counter bore. The upper end of the mandrel also includes a plurality of outwardly extending teeth. The upper body portion includes one or more pin members that extend into the counter bore and engage the teeth, thus locking the mandrel in place with respect to the upper body portion. The mandrel may be moved longitudinally in the counter bore thus disengaging the teeth from the pin members and allowing the mandrel to rotate freely about its longitudinal axis with respect to the upper body portion.

A mechanical locking swivel is also currently commercially available from Boyd's Rental Tools of New Iberia, La., and is the subject of co-pending U.S. patent application Ser. No. 09/498,188. In this commercially available tool, the upper body portion includes a plurality of teeth extending inward into the counter bore (rather than the pin members disclosed in the '712 patent). The teeth on the upper body portion slideably engage the teeth on the mandrel when the mandrel and upper body portion are pulled apart, thus locking the mandrel in place with the upper body portion. As described above with respect to the '712 patent, the mandrel may also be moved longitudinally in the counter bore towards the upper body portion, thus slideably disengaging the interlocking teeth and allowing the mandrel to rotate freely about its longitudinal axis with respect to the upper body portion.

While Boyd's commercially available locking swivel described above has shown itself to be highly serviceable, it is natural that repeated locking and unlocking (i.e., engaging and disengaging of the teeth disposed on the upper body portion and the mandrel) tends to cause wear and/or damage to the teeth. In time, if the teeth become sufficiently worn and/or damaged, replacement of either or both the mandrel and upper body portion is typically required at significant expense. It has also been found that there is a possibility for locking swivel apparatuses to unlock while being coupled to a drill string, thus increasing the difficulty of the coupling procedure. Therefore, there exists a need for a yet further improved locking swivel apparatus.

SUMMARY OF THE INVENTION

In one aspect the present invention includes a locking swivel apparatus. The apparatus includes an upper body portion having a counter bore about a cylindrical axis and a mandrel receivable in the counter bore. The apparatus further includes a locking arrangement, including at least one replaceable gear member disposed to selectively couple and decouple the upper body portion and the mandrel via the at least one replaceable gear member, such selective coupling and decoupling disposed to correspondingly constrain and allow relative rotation of the upper body portion and the mandrel about the cylindrical axis. Methods are provided for fabricating and retrofitting embodiments of the present invention. Certain other embodiments may include optional extendable sleeves disposed to be selectively extended to interpose between a lower face of the upper body portion and a flange portion provided on the mandrel, such interposing securing the coupling of the upper body portion and the mandrel.

In one variation of this aspect the locking arrangement includes first and second replaceable gear members, the first gear member disposed to engage with a plurality of teeth disposed on the mandrel and the second gear member disposed to engage with a plurality of teeth disposed in the counter bore of the upper body portion. The first and second gear members are selectively engageable and disengageable with one another such that engagement of the first and second gear members with one another enables the coupling of the upper body portion and the mandrel, and disengagement of the first and second gear members with one another enables the decoupling of the upper body portion and the mandrel.

In another aspect this invention includes a method for selectively constraining or allowing relative rotation of lower and upper sections of a drill string. The method includes providing a locking swivel apparatus such as described in the preceding paragraphs, coupling the lower section of the drill string to the mandrel of the locking swivel, and coupling the upper section of the drill string to the upper body portion of the locking swivel. The method further includes utilizing the locking arrangement to enable the selective coupling and decoupling of the upper body portion and the mandrel.

It is therefore a technical advantage of the present invention to provide a locking swivel apparatus in which elements of the locking arrangement may be replaced if worn or damaged. The life of the non-worn or non-damaged elements of the apparatus is thus extended.

A further technical advantage of the invention is that optional extendable sleeves may be selectively extended within the apparatus to prevent accidental decoupling of the locking arrangement.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and the specific embodiment disclosed may be readily utilized as a basis for modifying or designing other structures for carrying out the same purposes of the present invention. It should be also be realize by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a schematic illustration of a drill string utilizing a locking swivel apparatus according to one exemplary embodiment of the present invention.

FIG. 2 is a perspective view of one exemplary embodiment of a locking swivel apparatus according to the present invention.

DETAILED DESCRIPTION

Figure 3:
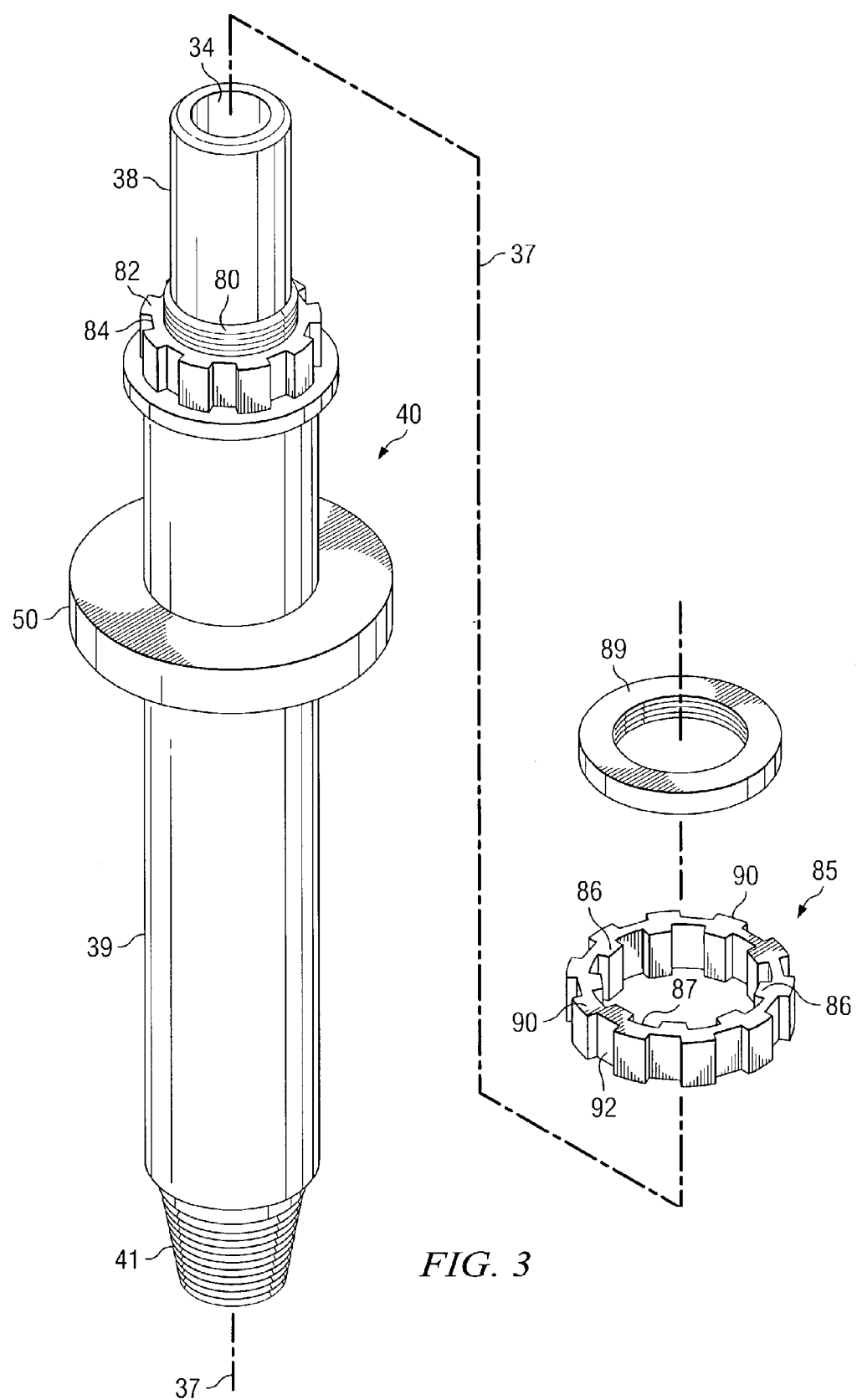
FIG. 3 is an exploded perspective view of a mandrel portion of the locking swivel apparatus of FIG. 2.

Referring briefly to the accompanying figures, this invention includes an improved mechanical locking swivel having at least one replaceable gear. Embodiments of the locking swivel of this invention include an upper body portion having a counter bore and a plurality of spaced apart teeth disposed on the counter bore wall that extend radially inward into the counter bore. A mandrel is slidably engaged within the counter bore of the upper body portion and typically includes a plurality of spaced apart teeth disposed on and extending radially outward from an outer surface thereof. Embodiments of the locking swivel of this invention include two replaceable gears, a first replaceable gear engaged with the teeth disposed on the upper body portion and a second replaceable gear engaged with the teeth disposed on the mandrel. The replaceable gears may also be selectively engaged and disengaged to one another, being engaged when the swivel is locked and disengaged when the swivel is unlocked. Embodiments of the locking swivel of this invention may include a supplemental locking mechanism for securing the swivel in the locked arrangement. Embodiments of the locking swivel of this invention may be coupleable to a drill string and useful in directional drilling, pipe recovery, wireline, and/or other oilfield applications.

Exemplary embodiments of the present invention advantageously provide a mechanical locking swivel apparatus including replaceable gears for locking and unlocking the swivel. Swivels embodying this invention may thus be advantageous in that the gears may be replaced and/or exchanged, for example, when they have become excessively worn or damaged, thus providing potentially significant cost savings as compared to prior art swivels in which replacing entire body portions may be necessary. These and other advantages of this invention will become evident in light of the following discussion of various embodiments thereof.

Referring now to FIG. 1, one embodiment of a locking swivel 10 of this invention is schematically illustrated in use in a drill string generally denoted as 12. In the exemplary embodiment shown, drill string 12 includes an upper drive assembly 14 positioned above a multiple entry apparatus 16, e.g., of the type disclosed in U.S. Pat. No. RE 33,150 to Boyd. The multiple entry apparatus 16 may include a principal body portion 18 and an entry portion 20 offset from a longitudinal axis of the drill string 12. Entry portion 20 may include an upper fixture 22 for feeding a wireline 24 down through a bore in the drill string 12, as illustrated. The swivel apparatus 10 may be coupled to a section of drill pipe 25 that is mounted below the multiple entry apparatus. The swivel apparatus 10 may further coupled to a section of drill pipe 26, which may be moved into and out of the well bore at the level of the rotary table 28.

It will be understood by those of ordinary skill in the art that embodiments of the swivel apparatus of the present invention are not limited to use with a multiple entry wireline apparatus, such as shown in FIG. 1. Embodiments of the swivel apparatus are equally well suited for substantially any application in which it is desirable to selectively rotate or lock a lower portion of a drill string with respect to an upper portion of the drill string. It will be further understood by those of ordinary skill in the art that embodiments of the swivel apparatus of this invention are not limited to use in oilfield applications, but may be used in substantially any application in which a locking swivel may be useful.

Referring now to FIG. 2, one exemplary embodiment of a locking swivel 10 according to present invention is illustrated in perspective view. In FIG. 2, locking swivel 10 is typically a substantially cylindrical tool, being largely symmetrical about cylindrical axis 37 (also referred to herein as a longitudinal axis). Swivel 10 includes a mandrel 40, one end of which is slidably engaged with a counter bore (not shown in FIG. 2) of an upper end portion 32, as described in more detail below with respect to FIGS. 3 through 6. A cap member 44, threadably engaged with upper end portion 32, prevents the mandrel 40 from disengaging from the upper end portion 32. Cap member 44 may optionally include one or more securing members 43 for securing the cap member 44 in place (e.g., a threaded hex bolt threadably engaged with a corresponding threaded bore hole tightened against the upper body portion 32). In embodiments in which the swivel 10 is coupled to a drill string (e.g., drill string 12 in FIG. 1), the mandrel 40 and upper end portion 32 may include threaded end portions 41 and 30, respectively, for coupling to the drill string. Mandrel 40 and upper end portion 32 also typically include concentric through bores 34 and 35, respectively (e.g., for permitting drilling fluid to flow therethrough or for permitting a wireline apparatus to move therethrough).

Referring now to FIG. 3, an exploded perspective view of the mandrel 40 of the locking swivel 10 of FIG. 2 is illustrated. As described above with respect to FIG. 2, a lower end 39 of the mandrel 40 typically includes a threaded pin end 41, which is coupleable to a drill string. An upper end 38 of the mandrel 40 includes a plurality of teeth 82 that define spaces 84 therebetween and extend radially outward from cylindrical axis 37. The teeth 82 are typically integral with the mandrel 40, but may alternately be a portion of a separable component coupled thereto. The mandrel 40 further includes a first replaceable gear 85 (e.g., a spur gear) having a plurality of teeth 86 along an inner surface 87 thereof, which are sized and shaped to engage teeth 82. Gear 85 further includes a plurality of spaced apart teeth 90 on an outer surface 92 thereof. The teeth 90 on the outer surface 92 are sized and shaped to engage the teeth 104 on an inner surface of a second replaceable gear 98, which in turn is engaged with the upper body portion 32 as described in more detail hereinbelow with respect to FIGS. 4 through 7. A threaded ring 89 (or a suitable equivalent, such as a frictional fitting) engages a threaded portion 80 of upper end 38 and may be utilized to secure gear 85 in place, i.e., with the teeth 86 on the inner surface 87 thereof engaged with teeth 82. The mandrel 40 typically further includes flange 50 extending radially outward from the cylindrical axis 37. The artisan of ordinary skill will readily recognize that mandrel 40 may equivalently include an annular ring coupled thereto.

Figure 4:
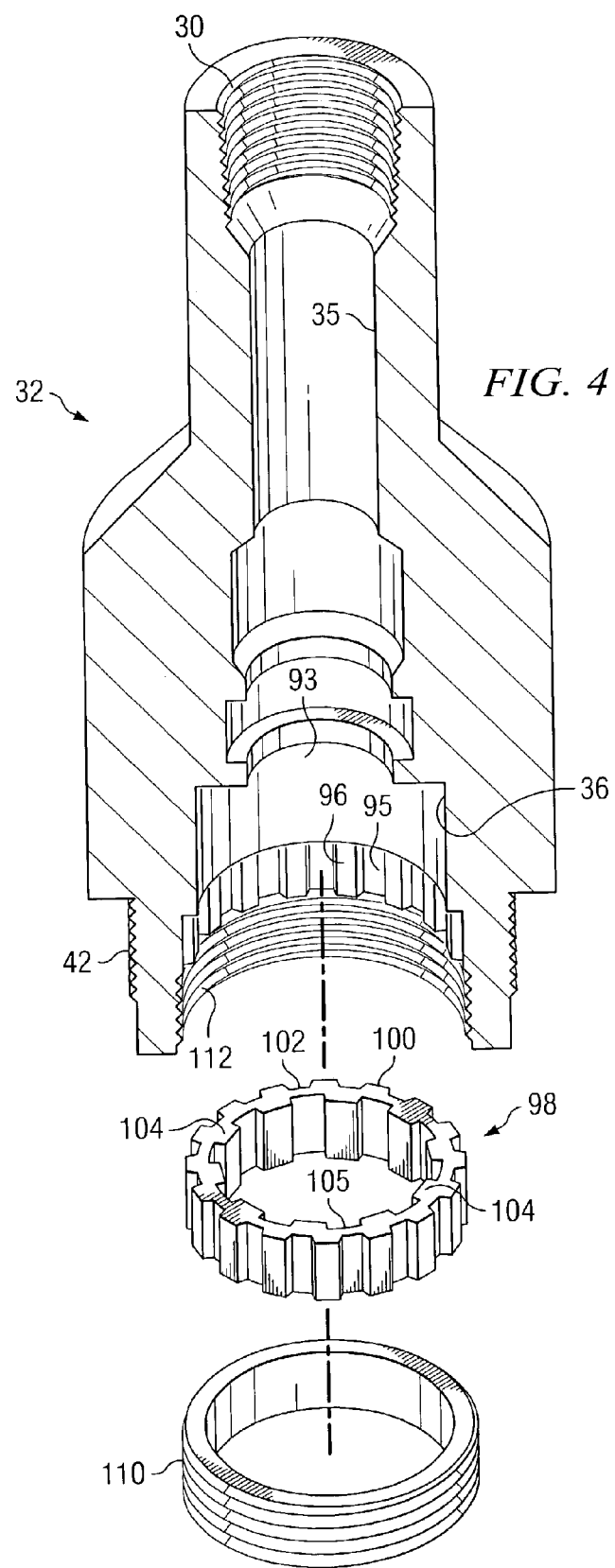
FIG. 4 is an exploded perspective view of an upper body portion of the locking swivel apparatus of FIG. 2.
Figure 5:
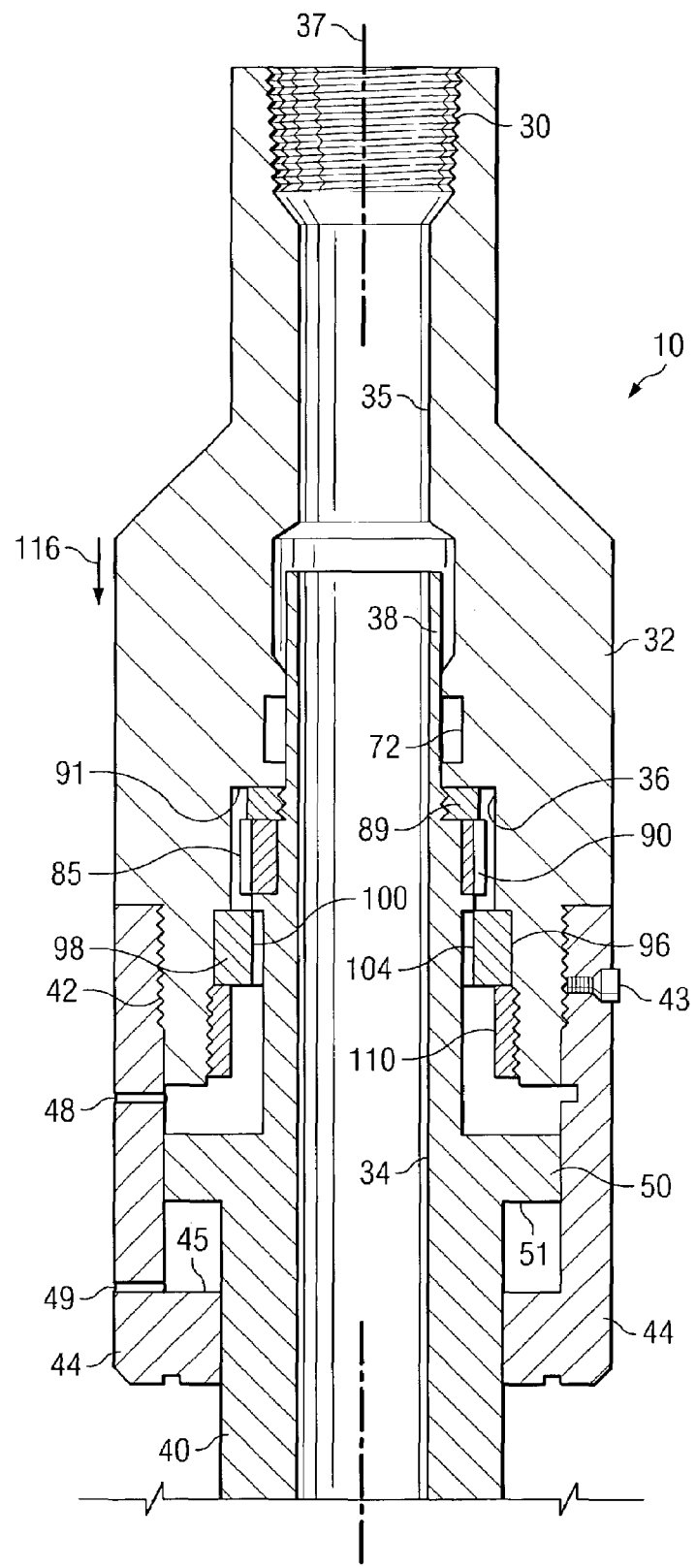
FIG. 5 is a cross-sectional view of the locking swivel apparatus of FIG. 2 in which the mandrel portion and the upper body portion are unlocked.
Figure 6:
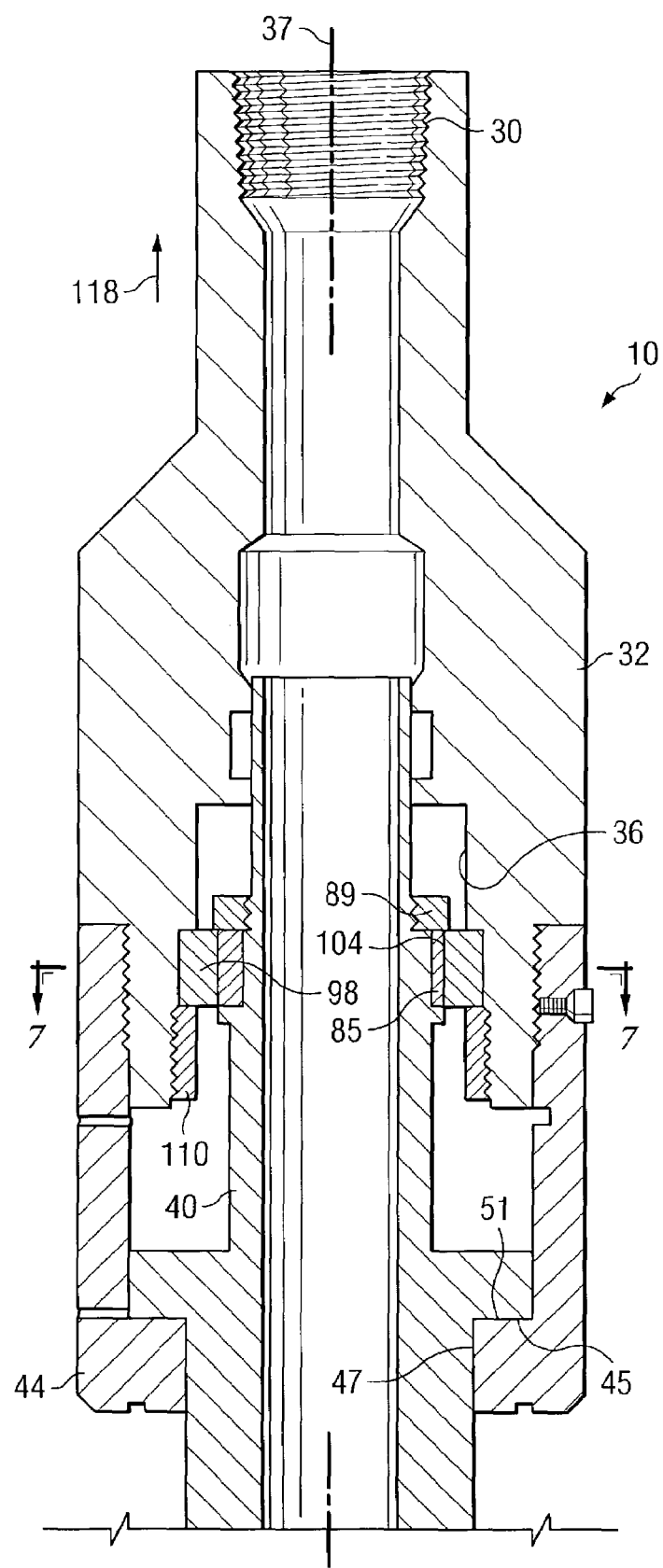
FIG. 6 is a cross-sectional view of the locking swivel apparatus of FIG. 2 in which the mandrel portion and the upper body portion are locked.

Referring now to FIG. 4, an exploded, partially cutaway view of the upper body portion 32 of the locking swivel 10 of FIG. 2 is illustrated. As described above with respect to FIG. 2, one end of the upper body portion 32 typically includes a threaded counter bore 30 for coupling to a drill string. The end opposite the threaded counter bore 30 typically includes an enlarged counter bore 36 for receiving the mandrel 40 as shown in FIGS. 5 and 6. A plurality of teeth 96, defining spaces 95 therebetween, protrudes radially inward from the inner wall 93 of the counter bore 36. The teeth 96 are typically integral with the inner wall 93 of the counter bore 36, but may alternately be a portion of a replaceable component coupled thereto. The upper body portion 32 typically includes a second replaceable gear 98 having a plurality of spaced apart teeth 100 on an outer surface 102 thereof, which are sized and shaped to engage teeth 96. Gear 98 also includes a plurality of spaced apart teeth 104 along an inner surface 105 thereof. The teeth 104 on the inner surface 105 of gear 98 are sized and shaped to engage the teeth 90 on the outer surface 92 of gear 85 as described above with respect to FIG. 3 and as described in more detail hereinbelow with respect to FIGS. 5–7. A threaded ring 110 (or a suitable equivalent) engages a threaded portion 112 of counter bore 36 and may be utilized to hold gear 98 in place, i.e., with the teeth 100 on the outer surface 102 thereof engaged with teeth 96.

Referring now to FIGS. 5 and 6, cross sectional schematic representations of a portion of the locking swivel 10 of FIG. 2 are illustrated. As described above with respect to FIGS. 2 through 4, locking swivel 10 includes a mandrel 40, the upper end 38 of which is slidably engaged in an enlarged counter bore 36 of upper body portion 32. The locking swivel 10 further includes a lower cap member 44 threadably engaged with a threaded portion 42 of the upper body portion 32. Threaded portion 42 typically includes a left-hand thread (rather than the standard right-hand thread) to discourage the cap member 44 from becoming disengaged from the upper body portion 32 during operation of the locking swivel 10. For example, the use of a left-hand thread may prevent the accidental loosening of the cap member 44 during the loosening of other threaded components (e.g., pin end 41 or threaded bore 30). The inner diameter of the lower opening 47 in cap member 44 is less than the outer diameter of flange 50. Thus threading the cap member 44 to the upper body portion 32 is intended to prevent the mandrel 40 from disengaging from within the enlarged counter bore 36.

For some applications, such as oil field applications in which a drilling fluid flows through the swivel apparatus, it may be desirable to provide a seal between the upper body portion 32 and the upper end 38 of the mandrel 40, for example to inhibit drilling fluid from penetrating the counter bore 36. Embodiments of the locking swivel apparatus 10 of this invention may, for example, include a recess 72 in the through bore 35 of the upper body portion for receiving one or more sealing assemblies. Suitable sealing assemblies include loaded lip seals such as a Polypack® seals, which are available from Gatlin Corporation (a distributor of Parker Seals), 661 St. Joseph Lane, Harvey, La. 70059. Embodiments of the locking swivel apparatus may also include one or more blowholes, such as upper and lower blowholes 48 and 49, for equalizing pressure in the counter bore 36 during locking and unlocking of the swivel 10.

With further reference to FIG. 5, locking swivel 10 is shown unlocked, i.e., the upper body portion 32 and the mandrel 40 are decoupled, allowing relative rotation of the upper body portion and the mandrel about the cylindrical axis 37. In order to unlock the swivel 10, the upper body portion 32 is moved in a downward direction 116, along cylindrical axis 37, with respect to the mandrel 40, thus causing the upper end 38 of the mandrel 40 to penetrate deeper into the counter bore 36 of the upper body portion 32, for example, until threaded ring 89 contacts the upper shoulder 91 of counter bore 36. The artisan of ordinary skill will readily recognize that this is analogous to pushing mandrel 40 upwards into counter bore 36 of the upper body portion 32. Moving upper body portion 32 downward will be seen to cause the teeth 90 on the outer surface 92 (FIG. 3) of the first replaceable gear 85 to become disengaged with the teeth 104 on the inner surface 105 (FIG. 4) of the second replaceable gear 98. Thus, as described above, the mandrel 40 is substantially free to rotate in counter bore 36 about cylindrical axis 37 with respect to upper body portion 32.

Figure 7:
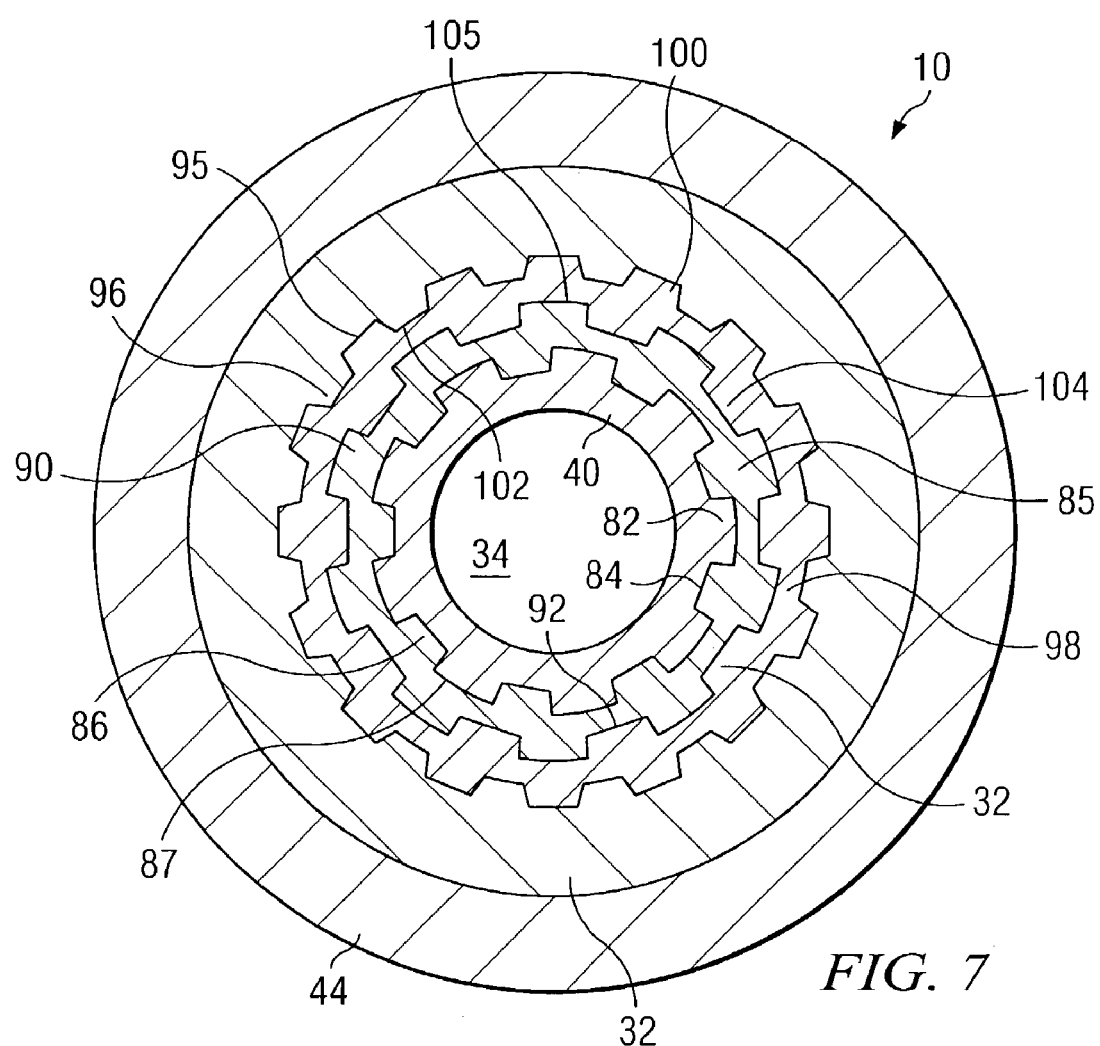
FIG. 7 is a cross sectional view as shown on section 7—7 of FIG. 6.

Referring now to FIGS. 6 and 7, locking swivel 10 is shown locked, i.e., the upper body portion 32 and the mandrel 40 are coupled, constraining the upper body portion 32 and the mandrel 40 to rotate together about the cylindrical axis 37. In order to lock the swivel 10, upper body portion 32 is moved in an upward direction 118 with respect to mandrel 40, thus moving the upper end 38 of the mandrel 40 out of the counter bore 36 of the upper body portion 32 and towards cap member 44, preferably until the lower side 51 of the flange 50 contacts the shoulder 45 of cap member 44. The artisan of ordinary skill will readily recognize that this motion substantially corresponds to pulling mandrel 40 downwards out of counter bore 36. The teeth 90 on the outer surface 92 of the first replaceable gear 85 are engaged with the teeth 104 on the inner surface 105 of the second replaceable gear 98. Thus, as described above, the mandrel 40 is constrained to rotate with upper body portion 32 about cylindrical axis 37.

In operation, locking swivel 10 may be coupled to a drill string, for example, as described above with respect to FIG. 1. In order to unlock the swivel 10 the weight of the drill string may be allowed to rest on the rotary table, causing the upper body portion 32 to slide downward 116 (FIG. 5) relative to the mandrel 40, thus disengaging outer teeth 90 of the first gear 85 from inner teeth 104 of the second gear 98. In order to lock the swivel 10, the drill string may be lifted off the rotary table, causing the upper body portion 32 to slide upward 118 (FIG. 6) relative to the mandrel until teeth 90 are engaged with teeth 104. The artisan of ordinary skill will readily recognize that swivel 10 may also be unlocked by urging the mandrel 40 upwards relative to the upper body portion 32 and locked by urging the mandrel 40 downward relative to the upper body portion 32. The artisan of ordinary skill will further recognize that in embodiments of the invention where locking and unlocking mechanisms are exposed to downhole fluids such as drilling fluid, the pressure of such fluids may tend to hold such mechanisms in a locked state (since bringing the mandrel and upper body portion together to unlock the swivel may compress the fluid). In such situations, it will be seen that the pressure of such fluids in the swivel will need to be reduced to zero, or thereabouts, in order to unlock the swivel.

As described hereinabove, the use of one or more replaceable gears (such as replaceable gears 85 and 98 described above) enables additional advantages in locking swivels. Repeated locking and unlocking can often cause wear and/or damage to the engaging teeth. In prior art locking swivels, in which the teeth are integral with the mandrel or upper body portion, replacement of either or both of the mandrel or upper body portion is typically required at some point in the life of a swivel, usually at significant expense. In swivel 10, however, the inner teeth 86 of first gear 90 remain engaged with teeth 82 of the mandrel 40. Likewise, the outer teeth 100 of the second gear 98 remain engaged with teeth 96 of the upper body portion 32. During locking and unlocking the outer teeth 90 of the first gear 85 engage and disengage, respectively, with the inner teeth 104 of the second gear 98, which tends to limit wear and/or damage to the replaceable gears 85 and 98. Thus, in the event that either or both of these sets of teeth become worn or damaged, the replaceable gear, or gears, may be removed and replaced.

While the embodiments of the locking swivel 10 shown in FIGS. 2–7 include two replaceable gears, it will be appreciated that alternative embodiments of this invention may include any number of replaceable gears. For example, embodiments of this invention may include a single replaceable gear having inner and outer teeth configured to engage teeth disposed on the mandrel and upper body portions, respectively. The single replaceable gear may further be fabricated from a material having a hardness value less than that of the mandrel and upper body portions, thus substantially preventing wear and damage to the teeth that are integral with the mandrel and upper body portions. For some applications, embodiments including a single replaceable gear may be advantageous in that it simplifies, and thus tends to reduce the cost of fabrication. Alternatively, in other applications, embodiments of this invention including three or more replaceable gears may be advantageous.

Figure 8:
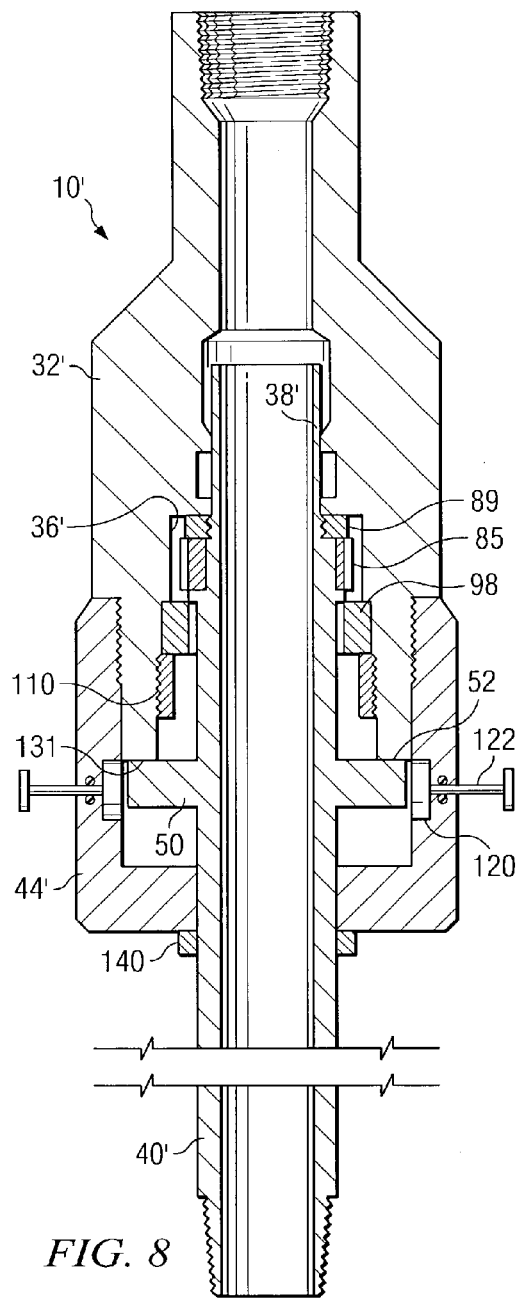
FIG. 8 is a cross sectional view of another exemplary embodiment of the present invention in which a mandrel portion and an upper body portion are unlocked.
Figure 9:
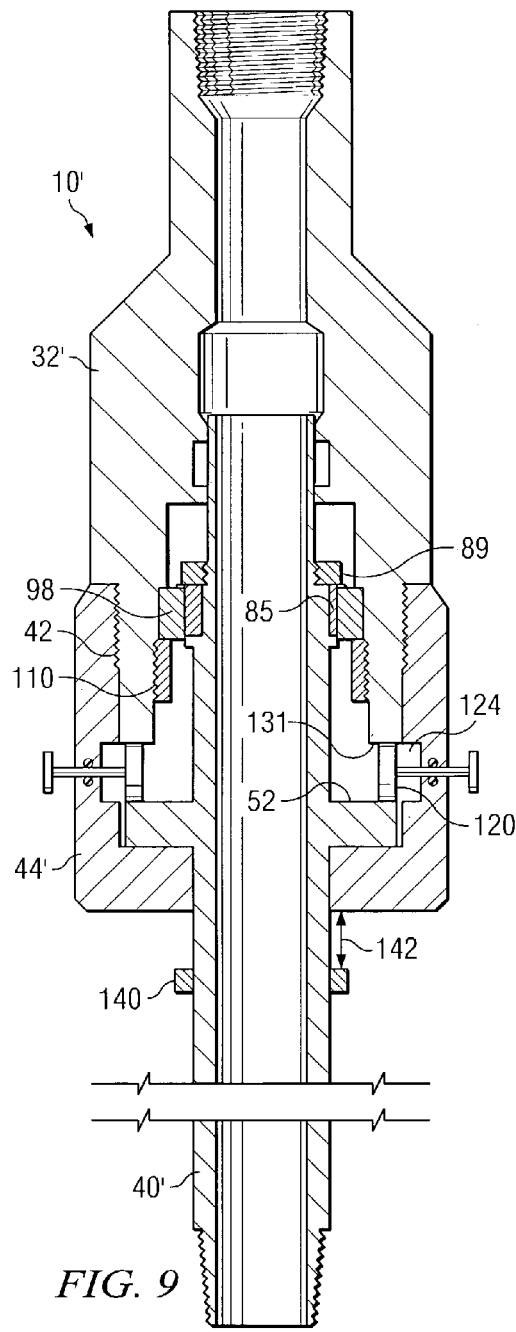
FIG. 9 is a cross sectional representation of the locking swivel apparatus of FIG. 8 in which the mandrel portion and the upper body portion are locked.

Referring now to FIGS. 8 and 9, further alternate embodiments of this invention are illustrated. Locking swivel 10' is similar to the locking swivel 10 illustrated in FIGS. 2 through 7, in that it includes a mandrel 40', the upper end 38' of which is slidably engaged in an enlarged counter bore 36' of an upper body portion 32'. The locking swivel 10' further includes a lower cap member 44' threadably engaged with the upper body portion 32'. Locking swivel 10' differs from locking swivel 10 in that when in the unlocked position (FIG. 8) an upper face 52 of flange 50 contacts a lower face 131 of the upper body portion 32' (rather than threaded ring 89 contacting shoulder 91 as shown in FIG. 5). Swivel 10' further includes an optional indicator ring 140 that provides a quick visual indication to an operator of whether the swivel is locked or unlocked. When the swivel 10' is unlocked, the indicator ring 140 is positioned substantially adjacent to cap member 44' as shown in FIG. 8. When the swivel 10' is locked, a gap 142 is present between indicator ring 140 and cap member 44' as shown in FIG. 9.

Figure 11:
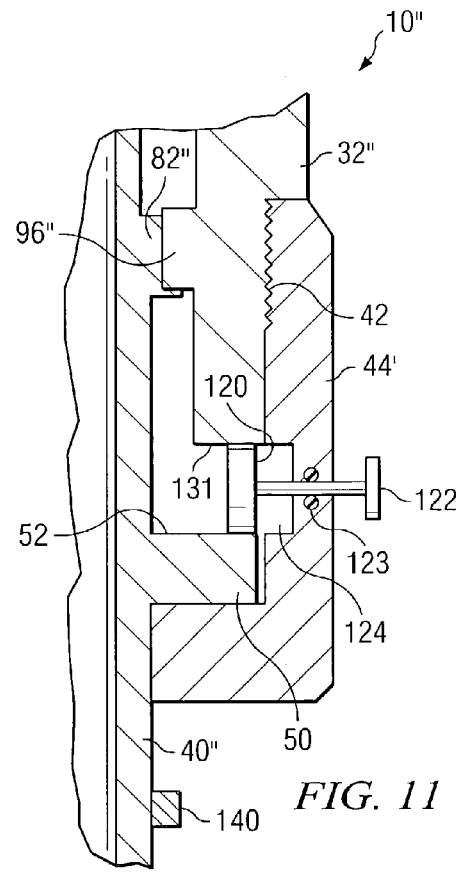
FIG. 11 is a cross sectional representation of a portion of yet another exemplary embodiment of the present invention showing the engagement of a hideaway sleeve.
Figure 10:
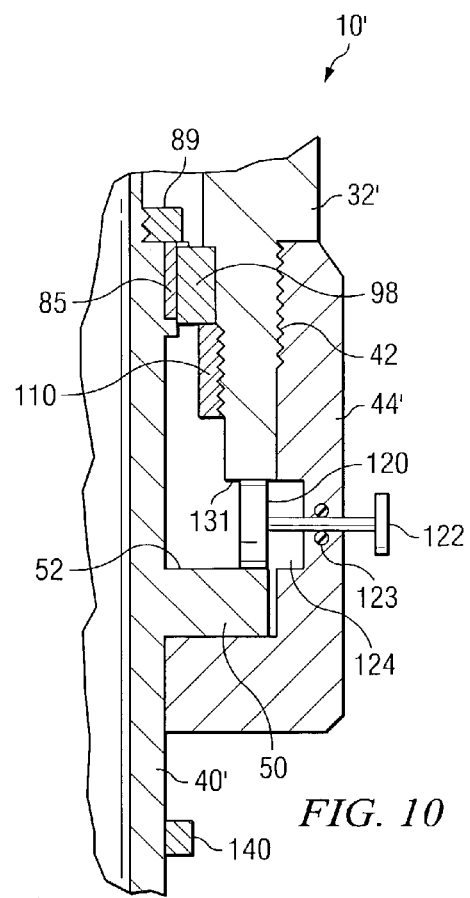
FIG. 10 is a cross sectional representation of a portion of the locking swivel apparatus of FIG. 8 showing the engagement of a hideaway sleeve.

Referring now also to FIGS. 10 and 11, other embodiments of locking swivel according to the present invention may also include a supplemental locking mechanism that prevents the locking swivel from accidentally unlocking. The supplemental locking mechanism is configured to prevent the mandrel from moving with respect to the upper body portion in a direction substantially parallel to the cylindrical axis, by interposing a substantially rigid member between a lower face of the upper body portion and a flange portion of the mandrel.

In the embodiments shown in FIGS. 8 through 11, the supplemental locking mechanism includes one or more hideaway sleeves 120 that are extendable radially inward from cap member 44' and thus may be interposed between the lower face 131 of the upper body portion 32' and the upper face 52 of flange 50. Extension of hideaway sleeves 120 prevent upper body portion 32' from moving downward relative to mandrel 40' and thus prevent the swivel 10' from unlocking. In order to unlock the swivel 10', the hideaway sleeves 120 are retractable into hideaway recesses 124 in the cap member 44', thus allowing the upper body portion 32' to slide downward relative to mandrel 40 until lower face 131 contacts upper face 52 of flange 50. The hideaway sleeves 120 may further be coupleable (e.g., threaded) to corresponding pin members 122 that extend radially outward through the lower cap member 44'. An o-ring assembly 123, or suitable equivalent, may also be utilized to provided a frictional fitting between the pin members 122 and the cap member 44' for preventing the sleeves 120 from inadvertently extending or retracting during use of the swivel 10', e.g., via tool vibration. While the hideaway sleeve(s) 120 shown in FIGS. 8 through 11 are typically manually extended and retracted, it will be understood that they may alternatively and/or additionally be extended and retracted by a non-manual mechanism, such as a hydraulic or pneumatic piston.

The use of a supplemental locking mechanism, such as that shown in FIGS. 8 through 11, may be advantageous for some applications. For example, in oil field applications in which the swivel is coupled to a drill string, it is common practice to allow at least a portion of the weight of the swivel to rest on the section of drill pipe to which the mandrel is to be coupled. As a result, there is possibility that the upper body portion may accidentally slide downward relative to the mandrel and thus unlock the swivel (e.g., disengage gears 85 and 98 in embodiment 10), which may make it more difficult to thread the mandrel to the drill string. The use of a supplemental locking mechanism, however, such as, for example, the hideaway sleeves 120 coupled to pin members 122, prevents the swivel 10' from unlocking under its own weight and thus, in the exemplary use of a locking swivel in a drill string, may simplify the coupling procedure with the drill string.

The artisan of ordinary skill will readily recognize that embodiments of the locking swivel including a supplementary locking mechanism may include substantially any locking arrangement. For example, embodiments of a locking swivel including a supplementary locking mechanism may include a locking arrangement similar to that disclosed herein in which one or more replaceable gears selectively couple and decouple the upper body portion and the mandrel. Other embodiments of a locking swivel including a supplemental locking mechanism may include a locking arrangement similar to that provided by the Boyd's commercially available locking swivel, described above in the background section. In such commercially available tools, a plurality of teeth disposed on an outer surface of the mandrel are engageable with a plurality of teeth disposed in the counter bore of the upper body portion. Locking swivel 10″, shown in FIG. 11, utilizes a similar locking arrangement in which teeth 82″ of mandrel 40″ engage teeth 96″ of upper body portion 32″ when the swivel 10″ is locked. Yet other embodiments of a locking swivel including a supplemental locking mechanism may include a locking arrangement similar to that disclosed in U.S. Pat. No. 6,244,345 in which a plurality of teeth (i.e., spline) disposed on an outer surface of an internal locking mandrel engage a plurality of teeth disposed on the inner surfaces of a swivel mandrel and/or a lower body portion. Still other embodiments of a locking swivel including a supplemental locking mechanism may include a locking arrangement similar to that disclosed in U.S. Pat. No. 5,996,712 in which one or more pin members extend through the upper body portion and selectively engage and disengage with a plurality of teeth disposed on an outer surface of the mandrel.

The artisan of ordinary skill will readily appreciate that although the embodiments as illustrated and described depict a device that is manually coupled and decoupled to correspondingly lock and unlock the locking swivel apparatus, other embodiments not illustrated will be within the scope of this invention that may include power assistance for coupling and decoupling. For example, such power assistance may include hydraulic or pneumatic actuation.

The embodiments of the swivel apparatus described herein are typically fabricated from metal forgings or metal stock using conventional fabrication techniques (e.g., machining). The artisan of ordinary skill will readily recognize that embodiments of the locking swivel apparatus may also be fabricated by converting substantially any swivel apparatus having an upper body portion with a counter bore and a mandrel receivable in the counter bore into a locking swivel apparatus with replaceable gear members. Such retrofitting will be appreciated to be available, for example, on non-locking swivels, or on locking swivels whose teeth have become worn or damaged. For example, in a non-locking swivel, a plurality of teeth may be formed in the upper body portion, extending into the counter bore thereof and a plurality of teeth may be formed in the mandrel, extending outward from an outer surface thereof. A first replaceable gear may be disposed in engagement with the teeth of the mandrel and a second replaceable gear may be disposed in engagement with the teeth of the upper body portion such that the first and second replaceable gears are selectively engageable and disengageable with one another. The mandrel may be positioned in the counter bore such that said selective engagement and disengagement of the first and second replaceable gears correspondingly couples and decouples the upper body portion and the mandrel, constraining and allowing relative rotation of the upper body portion and the mandrel about the cylindrical axis.

Alternatively, the artisan of ordinary skill will appreciate that existing locking swivel devices with worn or damaged teeth may also be retrofitted with replaceable gear members. The worn or damaged teeth in the upper body and mandrel may be formed or shaped to receive replaceable gear members such that the gear members are selectively engageable and disengageable with one another as the mandrel and upper body are reciprocated parallel to the cylindrical axis.

Although the present invention and its advantages have been described in detail, it should be understood that various changes, substitutions and alternations can be made herein without departing from the spirit and scope of the invention as defined by the appended claims.

I claim:

1. A locking swivel apparatus comprising:
   an upper body portion having a counter bore about a cylindrical axis;
   a mandrel receivable in the counter bore; and
   a locking arrangement including at least one replaceable gear member, the replaceable gear member disposed to engage (i) the upper body portion and (ii) the mandrel, the locking arrangement further disposed to selectively couple and decouple the upper body portion and the mandrel via the at least one replaceable gear member, said selective coupling and decoupling disposed to correspondingly constrain and allow relative rotation of the upper body portion and the mandrel about the cylindrical axis.

2. The locking swivel apparatus of claim 1, wherein the upper body portion includes a lower face confronting a flange portion provided on the mandrel, the locking swivel apparatus further comprising at least one extendable sleeve disposed to be selectively extended to interpose between the lower face and the flange portion, said interposing securing said coupling of the upper body portion and the mandrel.

3. The locking swivel apparatus of claim 2, further comprising a lower cap member threadably engaged with the upper body portion, the lower cap member including at least one recess into which the at least one extendable sleeve may be retracted, retraction of the at least one extendable sleeve allowing said selective coupling and decoupling of the upper body portion and the mandrel.

4. The locking swivel apparatus of claim 3, further comprising at least one pin member extending through the lower cap member and threaded to a corresponding one of the at least one extendable sleeves.

5. The locking swivel apparatus of claim 1, being coupleable to a drill string.

6. The locking swivel apparatus of claim 5, wherein the mandrel includes a threaded end distal from the counter bore for coupling with the drill string.

7. The locking swivel apparatus of claim 5, wherein the upper body portion includes a threaded end distal from the counter bore for coupling with the drill string.

8. The locking swivel apparatus of claim 1, further including a lower cap member threadably engageable with the upper body portion.

9. The locking swivel apparatus of claim 8, wherein the lower cap member includes a left-hand thread.

10. The locking swivel apparatus of claim 8, wherein the lower cap member further comprises at least one blow hole extending therethrough for equalizing pressure in the counter bore during said coupling and decoupling of the upper body portion and the mandrel.

11. The locking swivel apparatus of claim 1, further comprising an indicator for providing visual indication of whether the upper body portion and the mandrel are in a coupled or decoupled position.

12. The locking swivel apparatus of claim 1, wherein said decoupling of the upper body portion and the mandrel is enabled by urging the mandrel deeper into the counter bore in a direction substantially parallel to the cylindrical axis.

13. The locking swivel apparatus of claim 1, wherein said coupling of the upper body portion and the mandrel is enabled by urging the mandrel out of the counter bore in a direction substantially parallel to the cylindrical axis.

14. The locking swivel apparatus of claim 1, wherein the mandrel further comprises a flange extending outward from an outer surface thereof.

15. The locking swivel apparatus of claim 14, wherein the flange contacts a lower face of the upper body portion when the upper body portion and the mandrel are in a decoupled position.

16. The locking swivel apparatus of claim 14, wherein the flange contacts a shoulder portion of the cap member when the upper body portion and the mandrel are in a coupled position.

17. The locking swivel apparatus of claim 1, further comprising manual actuation of said selective coupling and decoupling of the upper body portion and the mandrel.

18. The locking swivel apparatus of claim 1, further comprising power-assisted actuation of said coupling and decoupling of the upper body portion and the mandrel.

19. The locking swivel apparatus of claim 18, wherein said power-assisted actuation includes actuation selected from the group consisting of:
   (a) hydraulic actuation; and
   (b) pneumatic actuation.

20. The locking swivel apparatus of claim 1, in which at least one of the replaceable gear members have been retrofitted onto the locking arrangement.

21. The locking swivel apparatus of claim 1, wherein the replaceable gear member is disposed to engage a plurality of spaced apart teeth formed on an outer surface of the mandrel.

22. The locking swivel apparatus of claim 1, wherein the replaceable gear member is disposed to engage a plurality of spaced apart teeth formed on an inner surface of the counter bore.

23. The locking swivel apparatus of claim 1, wherein the replaceable gear member is lubricated from a material of lower hardness than that of at least one of the upper body portion and the mandrel.

24. The locking swivel apparatus of claim 1, wherein the locking arrangement comprises first and second replaceable gear members, the first gear member disposed to engage with a plurality of teeth formed on the mandrel and the second gear member disposed to engage with a plurality of teeth formed in the counter bore of the upper body portion, the first and second gear members being selectively engageable and disengageable with one another.

25. The locking swivel apparatus of claim 24, wherein said engagement of the first and second gear members with one another enables said coupling of the upper body portion and the mandrel.

26. The locking swivel apparatus of claim 24, wherein said disengagement of the first and second gear members with one another enables said decoupling of the upper body portion and the mandrel.

27. A locking swivel apparatus comprising:
   an upper body portion having an enlarged counter bore about a cylindrical axis;
   a mandrel receivable in the counter bore;
   the upper body portion including a plurality of spaced apart teeth extending radially inward into the counter bore;
   the mandrel including a plurality of spaced apart teeth extending radially outward from an outer surface thereof;
   a first replaceable gear member disposed to engage with the teeth of the mandrel; and
   a second replaceable gear member disposed to engage with the teeth of the upper body portion;
   the first and second replaceable gear members selectively engageable and disengageable with one another to correspondingly couple and decouple the upper body portion from the mandrel, said coupling and decoupling disposed to correspondingly constrain and allow relative rotation of the upper body portion and the mandrel about the cylindrical axis.

28. The locking swivel apparatus of claim 27, wherein the first gear member comprises a plurality of teeth disposed on an inner surface thereof engaged with the teeth extending outward from the outer surface of the mandrel.

29. The locking swivel apparatus of claim 28, further comprising a threaded ring, the threaded ring disposed to secure the first gear member in said engagement with the teeth extending outward from the outer surface of the mandrel.

30. The locking swivel apparatus of claim 27, wherein the second gear member comprises a plurality of teeth disposed on an outer surface thereof engaged with the teeth extending into the counter bore of the upper body portion.

31. The locking swivel apparatus of claim 30, further comprising a threaded ring, the threaded ring disposed to secure the second gear member in said engagement with the teeth extending into the counter bore of the upper body portion.

32. The locking swivel apparatus of claim 27, wherein the first gear member comprises a plurality of first gear teeth disposed on an outer surface thereof, the first gear teeth selectively engageable and disengageable with a plurality of second gear teeth disposed on an inner surface of the second gear member.

33. The locking swivel apparatus of claim 27, wherein said decoupling of the upper body portion and the mandrel is enabled by urging the mandrel deeper into the counter bore in a direction substantially parallel to the cylindrical axis.

34. The locking swivel apparatus of claim 27, wherein said coupling of the upper body portion and the mandrel is enabled by urging the mandrel out of the counter bore in a direction substantially parallel to the cylindrical axis.

35. The locking swivel apparatus of claim 27, being coupleable to a drill string.

36. The locking swivel apparatus of claim 35, wherein the mandrel includes a threaded end distal from the counter bore for coupling with the drill string.

37. The locking swivel apparatus of claim 35, wherein the upper body portion includes a threaded end distal from the counter bore for coupling with the drill string.

38. The locking swivel apparatus of claim 27, further including a lower cap member threadably engageable with the upper body portion.

39. The locking swivel apparatus of claim 38, wherein the lower cap member includes a left-hand thread.

40. The locking swivel apparatus of claim 38, wherein the lower cap member further comprises at least one blow bole extending therethrough for equalizing pressure in the counter bore during said coupling and decoupling of the upper body portion and the mandrel.

41. The locking swivel apparatus of claim 27, further comprising an indicator for providing visual indication of whether the upper body portion and the mandrel are in a coupled or decoupled position.

42. The locking swivel apparatus of claim 27, wherein the mandrel further comprises a flange extending outward from an outer surface thereof.

43. The locking swivel apparatus of claim 42, wherein the flange contacts a lower face of the upper body portion when the upper body portion and the mandrel are in a decoupled position.

44. The locking swivel apparatus of claim 42, wherein the flange contacts a shoulder portion of the cap member when the upper body portion and the mandrel are in a coupled position.

45. The locking swivel apparatus of claim 27, wherein the upper body portion includes a lower face confronting a flange portion provided on the mandrel, the locking swivel apparatus further comprising at least one extendable sleeve disposed to be selectively extended to interpose between the lower face and the flange portion, said interposing securing said coupling of the upper body portion and the mandrel.

46. The locking swivel apparatus of claim 45, further comprising a lower cap member threadably engaged with the upper body portion, the lower cap member including at least one recess into which the at least one extendable sleeve may be retracted, retraction of the at least one extendable sleeve allowing said selective coupling and decoupling of the upper body portion and the mandrel.

47. The locking swivel apparatus of claim 46, further comprising at least one pin member extending through the lower cap member and threaded to a corresponding one of the at least one extendable sleeves.

48. The locking swivel apparatus of claim 27, further comprising manual actuation of said selective coupling and decoupling of the upper body portion and the mandrel.

49. The locking swivel apparatus of claim 27, further comprising power-assisted actuation of said coupling and decoupling of the upper body portion and the mandrel.

50. The locking swivel apparatus of claim 49, wherein said power-assisted actuation includes actuation selected from the group consisting of:

(a) hydraulic actuation; and (b) pneumatic actuation.

51. The locking swivel apparatus of claim 27, in which at least one of the first and second gear members have been retrofitted onto the locking arrangement.

* * * * *